(12) United States Patent
Wang

(10) Patent No.: US 9,465,599 B2
(45) Date of Patent: Oct. 11, 2016

(54) METHOD, DEVICE AND SYSTEM FOR INSTALLING TERMINAL SOFTWARE

(75) Inventor: Ligang Wang, Shenzhen (CN)

(73) Assignee: ZTE Corporation, Shenzhen (CN)

(*) Notice: Subject to any disclaimer, the term of this patent is extended or adjusted under 35 U.S.C. 154(b) by 444 days.

(21) Appl. No.: 13/977,835

(22) PCT Filed: Apr. 2, 2011

(86) PCT No.: PCT/CN2011/072447
§ 371 (c)(1),
(2), (4) Date: Jul. 1, 2013

(87) PCT Pub. No.: WO2012/094853
PCT Pub. Date: Jul. 19, 2012

(65) Prior Publication Data
US 2013/0283255 A1    Oct. 24, 2013

(30) Foreign Application Priority Data

Jan. 12, 2011  (CN) .......................... 2011 1 0005933

(51) Int. Cl.
G06F 9/44    (2006.01)
G06F 9/455   (2006.01)
G06F 9/445   (2006.01)

(52) U.S. Cl.
CPC .. *G06F 8/61* (2013.01); *G06F 8/68* (2013.01)

(58) Field of Classification Search
CPC .......................................................... G06F 9/61
USPC .................................................. 717/170, 178
See application file for complete search history.

(56) References Cited

U.S. PATENT DOCUMENTS

| 6,073,062 | A  | * | 6/2000  | Hoshino et al. | ................... | 701/3   |
| 7,222,240 | B2 | * | 5/2007  | Elteto         | ........................... | 713/185 |
| 7,818,021 | B2 | * | 10/2010 | Kitaji et al.  | ................... | 455/522 |
| 7,831,969 | B2 | * | 11/2010 | Kadota         | ........................ | 717/178 |

(Continued)

FOREIGN PATENT DOCUMENTS

| CN | 1581123 A   | 2/2005 |
| CN | 101110039 A | 1/2008 |

(Continued)

OTHER PUBLICATIONS

An English Translation of the International Search Report and the Written Opinion both dated Oct. 13, 2011, which issued during the prosecution of Applicant's PCT/CN2011/072447.

(Continued)

*Primary Examiner* — Camquy Truong
(74) *Attorney, Agent, or Firm* — Diederiks & Whitelaw, PLC

(57) ABSTRACT

The present invention provides a method, a device and a system for installing terminal software. The method comprises: a terminal determining to access a computer host as a driver according to attributes of a current port, and uploading an automatic operating program to the host; the host running the autorun program, and then the automatic operating program obtaining information related to terminal software on the host and feeding the obtained information related to terminal software back to the terminal; the terminal using the information related to terminal software to obtain corresponding terminal software from a server, and uploading the obtained terminal software to the host; and the automatic operating program installing the terminal software on the host.

9 Claims, 4 Drawing Sheets

(56) References Cited

U.S. PATENT DOCUMENTS

| | | | |
|---|---|---|---|
| 2001/0042112 A1 | 11/2001 | Slivka et al. | |
| 2003/0182414 A1* | 9/2003 | O'Neill | G06F 8/65 709/223 |
| 2004/0034862 A1* | 2/2004 | Kadota | 719/321 |
| 2004/0128371 A1* | 7/2004 | Park et al. | 709/221 |
| 2005/0038927 A1* | 2/2005 | Choi et al. | 710/8 |
| 2005/0244037 A1* | 11/2005 | Chiu et al. | 382/124 |
| 2007/0094322 A1* | 4/2007 | Peev | H04L 67/1095 709/202 |
| 2007/0216945 A1* | 9/2007 | Nakaju | 358/1.15 |
| 2008/0058025 A1* | 3/2008 | Kitaji et al. | 455/572 |
| 2010/0312919 A1* | 12/2010 | Lee et al. | 710/14 |

FOREIGN PATENT DOCUMENTS

| | | |
|---|---|---|
| CN | 101110039 A * | 1/2008 |
| WO | 2012/094853 | 7/2012 |

OTHER PUBLICATIONS

An English Translation of the International Preliminary Report on Patentability dated Jul. 16, 2013, which issued during the prosecution of Applicant's PCT/CN2011/072447.

* cited by examiner

METHOD, DEVICE AND SYSTEM FOR INSTALLING TERMINAL SOFTWARE

CROSS-REFERENCE TO RELATED APPLICATIONS

This application represents a National Stage application of PCT/CN2011/072447 entitled "Method, Device and System for Sharing Webpage Link" filed Apr. 2, 2011, pending.

FIELD OF THE INVENTION

The present invention relates to communication field, and in particular to a method, a device and a system for installing terminal software.

BACKGROUND OF THE INVENTION

At present, mobile terminal devices and personal computers are applied more and more closely. For meeting these applications, it is required to install device driver and application software (collectively called terminal software) on the personal computers for the mobile terminal devices. There are usually three installation methods as follows.

Method I: a Compact Disc (CD) fixed with an installation package is provided in a product package, and a user runs the installation package on the CD on the Personal Computer (PC).

Method II: an installation package is fixed in the memory of a product, and the self-starting function after the product is connected with a computer is triggered to run the installation package.

Method III: developers publish an installation package on their own websites, and a user visits the websites through a PC to manually download and run the installation package.

In Method I, the user needs to save the installation CD well. If the CD is lost or files are damaged, the application of a mobile terminal device is not available.

Method II has some improvements compared with Method I, but their common disadvantage is that both their installation packages are fixed, which cannot meet the requirement for updating the application software of products.

Although in Method III the latest installation package published by a manufacturer can be obtained, but the user has to download the installation package himself/herself, and constantly pay attention to the update of the websites. If the user cannot access the network, then the software package cannot be obtained, and the driver and the application software cannot be installed.

It follows that some of the three methods for installing terminal software require too much involvement of a user, and some require a lot of memory of a terminal, which is not convenient for the user to use, and thereby the user is influenced to normally use the mobile terminal device, and the satisfaction of the user is reduced.

SUMMARY OF THE INVENTION

The present invention mainly provides a method, a device and a system for installing terminal software, for at least solving the problem that it is inconvenient to install and use the terminal software.

According to one aspect of the present invention, a method for installing terminal software is provided, and the method comprises: a terminal determining to access a computer host as a driver according to attributes of a current port, and uploading an automatic operating program to the host; the host running the automatic operating program, and then the automatic operating program obtaining information related to terminal software on the host and feeding the obtained information related to terminal software back to the terminal; the terminal using the information related to terminal software to obtain corresponding terminal software from a server, and uploading the obtained terminal software to the host; and the automatic operating program installing the terminal software on the host.

Furthermore, the step of the automatic operating program obtaining the information related to terminal software on the host comprises: the automatic operating program recognizing system information of the host, and checking the information related to terminal software corresponding to the terminal according to the system information, wherein the information related to terminal software comprises: information about whether the terminal software of the terminal is complete and/or version information of the terminal software of the terminal.

Furthermore, the step of the terminal using the information related to terminal software to obtain corresponding terminal software from the server comprises: the terminal judging whether it is needed to obtain the corresponding terminal software from the server according to the information related to terminal software, and if YES, the terminal sending the information related to terminal software to the server; and the server searching the corresponding terminal software according to the information related to terminal software, and sending the found terminal software to the terminal.

Furthermore, the step of the terminal using the information related to terminal software to obtain corresponding terminal software from the server comprises: the terminal sending the information related to terminal software to the server; and the server searching the corresponding terminal software according to the information related to terminal software, and sending the found terminal software to the terminal.

Furthermore, the step of the terminal using the information related to terminal software to obtain the corresponding terminal software from the server comprises: when checking that the information related to terminal software is the version information of the terminal software of the terminal, the terminal using the version information of the terminal software to obtain a difference package of the terminal software from the server; and the step of the automatic operating program installing the terminal software on the host comprises: the automatic operating program using the difference package to update the terminal software of the host.

Furthermore, the step of the terminal using the version information of the terminal software to obtain the difference package of the terminal software from the server comprises: the terminal judging whether it is needed to check software update according to its own configuration information, and if YES, the terminal sending the version information of the terminal software to the server; and the server sending the difference package of the terminal software to the terminal according to the version information of the terminal software.

Furthermore, before the terminal judges whether it is needed to check software update according to its own configuration information, the method further comprises: the terminal setting an option needing to check software update, which is set in its own configuration information, to be valid at predetermined intervals, and setting the option needing to check software update to be invalid after each terminal software update is complete.

Furthermore, before the terminal judges whether it is needed to check software update according to its own configuration information, the method further comprises: the terminal receiving a setting instruction from the user, wherein the setting instruction is enabling or disabling the option needing to check software update; and the terminal setting the option needing to check software update according to the setting instruction.

Furthermore, after the automatic operating program installs the terminal software on the host, the method further comprises:

the automatic operating program sending a notification that installation is completed to the terminal;

after receiving the notification, the terminal setting the attributes of the current port and making the current port switch back to a normal work mode; and after detecting a switch of the current port of the terminal, the host exiting the automatic operating program.

According to another aspect of the present invention, a device for installing terminal software is provided; the device comprises: an accessing module, which is configured to determine to access a host as a driver according to attributes of a current port, upload an automatic operating program to the host so that the automatic operating program runs on the host, and obtain and feed back information related to terminal software on the host; and a software obtaining module, which is configured to use the information related to terminal software fed back by the host to obtain corresponding terminal software from the server, and upload the obtained terminal software to the host so that the automatic operating program installs the terminal software on the host.

According to another aspect of the present invention, a system for installing terminal software is provided; the system comprises: a host, a terminal and a server, wherein, the terminal comprises: an accessing module, which is configured to determine to access a host as a driver according to attributes of a current port, and upload an automatic operating program to the host; and a software obtaining module, which is configured to use information related to terminal software fed back by the host to obtain corresponding terminal software from the server, and upload the obtained terminal software to the host;

the host comprises: a running module, which is configured to run the automatic operating program uploaded by the terminal, wherein the automatic operating program obtains the information related to terminal software on the host, and feeds the obtained information related to terminal software back to the terminal; and an installation saving module, which is configured to save the terminal software installed by the automatic operating program; and the server comprises: a software providing module, which is configured to provide the terminal with the terminal software corresponding to the information related to terminal software.

Through the present invention, the terminal automatically uploads its own automatic operating program to the host after being connected to the host, so as to complete the automatic installation of the terminal software through the automatic operating program. In this way, the problem that it is inconvenient to install and use the terminal software is solved, the complexity of installing the terminal software by user is simplified, the user experience is enhanced while the cost is reduced, and the quality of products is improved.

BRIEF DESCRIPTION OF THE DRAWINGS

The drawings described here are used for providing a further understanding of the present invention, and constitute a part of the application. The exemplary embodiments of the present invention and the description thereof are used for illustrating the present invention without unduly limiting the scope of the present invention. In the drawings.

DETAILED DESCRIPTION OF EMBODIMENTS

The present invention will be described below with reference to the drawings and in conjunction with embodiments in detail. It needs to be noted that the embodiments of the present invention and features of the embodiments in the application can be combined with each other if there is no conflict.

According to the embodiments of the present invention, a terminal can automatically upload the automatic operating program to a host after being connected to the host by configuring the automatic operating program on the terminal, so as to complete the automatic installation of the terminal software through the automatic operating program. The whole installation process can be implemented without the involvement of a user, and thereby it is convenient for the user to use the terminal, and the satisfaction of the user is enhanced. On this basis, the embodiment of the present invention provides a method, a device and a system for installing terminal software.

Embodiment 1

Figure 1:
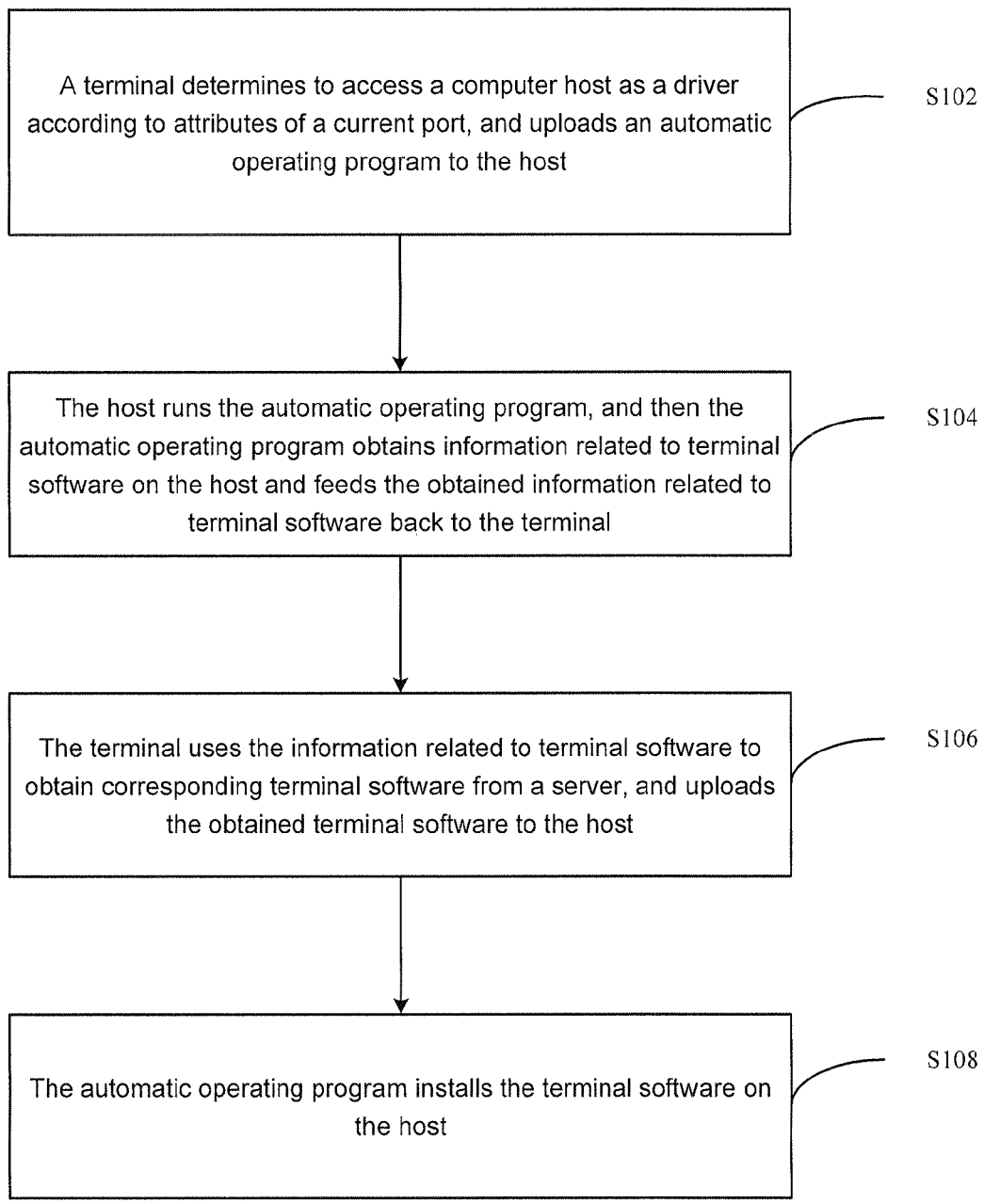
FIG. 1 is a flow chart of a method for installing terminal software according to Embodiment 1 of the present invention.

FIG. 1 is a flow chart of a method for installing terminal software according to one embodiment of the present invention, and the method comprises the steps as follows.

Step S102: The terminal determines to access the computer host as a driver according to attributes of the current port, and uploads the automatic operating program to the host.

The terminal in the embodiment of the present invention pre-stores the automatic so operating program, wherein the automatic operating program can be stored in the memory of the terminal. When connecting the terminal to the host, the user can set the port attributes of the terminal according to the actual situation, for example, if the user has known that there is software of the terminal installed on the current host, and the operations, such as updating, etc. are not needed, then the connection port between the terminal and the host can be set in a normal mode so that the terminal can operate according to the normal mode; and if the user connects the terminal to the current host for the first time, for implementing the automatic installation of the terminal software, the user can set the connection port between the terminal and the host as a driver so as to complete the following automatic installation of the terminal software, and in this situation, after being connected to the host through a USB cable, the terminal performs as a driver and will automatically upload the automatic operating program in the memory to the host.

Step S104: The host runs the automatic operating program, and then the automatic operating program obtains the information related to terminal software on the host and feeds the obtained information related to terminal software back to the terminal.

The process that the automatic operating program obtains the information related to terminal software on the host after running can be implemented in the following way: the automatic operating program recognizes system information of the host, and checks the information related to terminal software corresponding to the terminal according to the system information, wherein the information related to terminal software comprises: the information about whether the terminal software of terminal is complete and/or the version information of the terminal software of the terminal, for example, whether the driver of terminal is complete, whether the application program of the terminal is complete, etc; and wherein the system information comprises the operating system information of the host, the hardware configuration, the installation information of the terminal software and so on.

Step S106: The terminal uses the information related to terminal software to obtain corresponding terminal software from a server, and uploads the obtained terminal software to the host.

The process that the terminal uses the information related to terminal software to obtain corresponding terminal software from the server can be implemented in multiple ways, For example, the terminal judges whether it is needed to obtain the corresponding terminal software from the server according to the information related to terminal software; if YES, the terminal sends the information related to terminal software to the server; and the server searches the corresponding terminal software according to the information related to terminal software, and sends the found terminal software to the terminal. Alternatively, the terminal does not judge the information related to terminal software, but directly sends the information related to terminal software to the server; and the server searches the corresponding terminal software according to the information related to terminal software and then sends the found terminal software to the terminal. For the former, the terminal is required to judge whether it is needed to obtain the terminal software from the server itself, and the terminal establishes connection with the server only when necessary, so this way is reasonable. For the later, it is simpler to implement, but it may cause relatively frequent communication between the terminal and the server, which increases the treatment capacity of the server.

For the situation that the terminal accesses the host for the first time, since there is not any software of the terminal installed on the host, the information related to terminal software will be about that the terminal software of the terminal is incomplete. In this way, after receiving the feedback information, the terminal informs the server, downloads the installation packages, such as the driver and the application program of the terminal, etc. from the server, and uploads the installation packages to the host.

For the situation that the terminal accesses the host not for the first time, since there is related software of the terminal stored on the host, the information related to terminal software will be the version information of the terminal software of the terminal. On this basis, the process that the terminal uses the information related to terminal software to obtain the corresponding terminal software from the server comprises the step as follows: when checking that the information related to terminal software is the version information of the terminal software of the terminal, the terminal uses the version information of the terminal software to obtain a difference package of the terminal software from the server.

The difference package will be forwarded to the host by the terminal. At this point, the process that the automatic operating program installs the terminal software on the host comprises the step as follows: the automatic operating program uses the difference package to update the terminal software of the host. This terminal software updating way is quite quick, and the software transmitted in the communication process is small, which effectively ensures the success rate of transmission.

Preferably, the process that the terminal uses the version information of the terminal software to obtain the difference package of the terminal software from the server comprises the steps as follows: the terminal determines whether it is needed to check software update according to its own configuration information; if YES, the terminal sends the version information of the terminal software to the server; and the server sends the difference package of the terminal software to the terminal according to the version information of the terminal software.

The configuration information can be set by the user, and can also be set by the terminal according to a certain event. For example, the terminal sets the option needing to check software update in its own configuration information to be valid at predetermined intervals, and sets the option needing to check software update to be invalid after each terminal software update is complete. Alternatively, when the configuration information is set by the user, the method further comprises the steps as follows: the terminal receives the setting instruction from the user, wherein the setting instruction is enabling or disabling the option needing to check software update; and the terminal sets the option needing to check software update according to the setting instruction, for example, if the setting instruction is enabling, the terminal sets the option needing to check software update to be enabled, that is, the option is valid, otherwise, the terminal sets the option to be disabled, that is, the option is invalid.

Step S108: The automatic operating program installs the terminal software on the host.

After the automatic operating program installs the terminal software on the host, the method further comprises the steps as follows: the automatic operating program sends the notification that the installation is complete to the terminal; after receiving the notification, the terminal sets attributes of the current port and makes the port switch back to the normal work mode; and after detecting the switching of the current port of the terminal, the host exits the automatic operating program.

The terminal software in the embodiment comprises the driver of terminal, the application software of terminal and so on. The terminal and the server are in wireless connection. The latest installation package and difference package of the terminal software (driver and PC side software) of a manufacturer are stored on the server.

The terminal in the embodiment can be a mobile terminal device, such as mobile phone, etc.

After being connected to the host, the terminal in the embodiment automatically uploads its own automatic operating program to the host, so as to complete the automatic installation of the terminal software through the automatic operating program, and the whole installation process can be implemented without the involvement of the user, which solves the problem that it is inconvenient to install and use the terminal software. Simultaneously, by this way it is not required to occupy a lot of storage space of the terminal to store the terminal software, and the terminal software can be automatically updated timely, and thereby the complexity of installing the driver and the PC side software by user is simplified, the requirement of products for application update while reducing cost is met, the user experience is enhanced, and the quality of products is improved.

Embodiment 2

Figure 2:
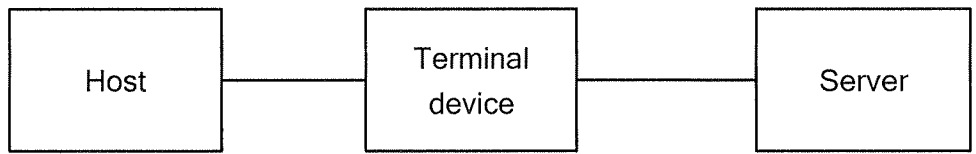
FIG. 2 is a structural block diagram of a system for installing terminal software according to Embodiment 2 of the present invention.

The embodiment is described by taking the system for installing terminal software shown in FIG. 2 for example. The system comprises:

the host, which is specifically the PC used by the user, and is connected with the terminal device through the port;

the terminal device, which is connected with the host through the port, and is connected with the server in a wireless way. There is the automatic operating program stored in the memory of the terminal device; and the server, which stores the latest installation package and difference package of the driver of terminal device and the PC side software of the manufacturer, and is connected with the terminal device in a wireless way.

The working principle of the system is as follows:

the terminal device performs as a driver after the port of the terminal device is connected to the host;

after finding there is new driver inserted, the host searches the automatic operating program in the driver, at this point, the terminal device provides the automatic operating program to the host, and then the host executes the automatic operating program; and the automatic operating program checks host information and the integrity of the driver and the PC side software, and sends them to the terminal device.

The terminal device uploads the sent information to the server. If the received information uploaded by the terminal is incomplete, the server directly sends the latest installation package. If the uploaded information is about that the driver is complete and the version information is included, the terminal device searches whether the version is latest, and if not, the server sends the corresponding update difference package.

The terminal device receives the installation package or the difference package; the downloaded files are temporarily stored in the memory of the mobile phone; after the download is complete, the terminal device informs the host; after obtaining a signal, the automatic operating program reads the installation package or the difference package to install the driver and the PC side software, and the automatic operating program informs the terminal device after the installation is complete. Alternatively, the terminal device directly uploads the downloaded data to the automatic operating program of the PC side while receiving the files of installation package or difference package; and after all of the files of installation package or difference package, which are sent by the server, are uploaded to the PC side, the automatic operating program runs the installation package or the difference package to install the driver and the PC side software, and informs the terminal device after the installation is complete.

After receiving the signal, the terminal device switches the port to enter the normal work mode.

An automatic installation program automatically exits after finding the switching of the port.

Figure 3:
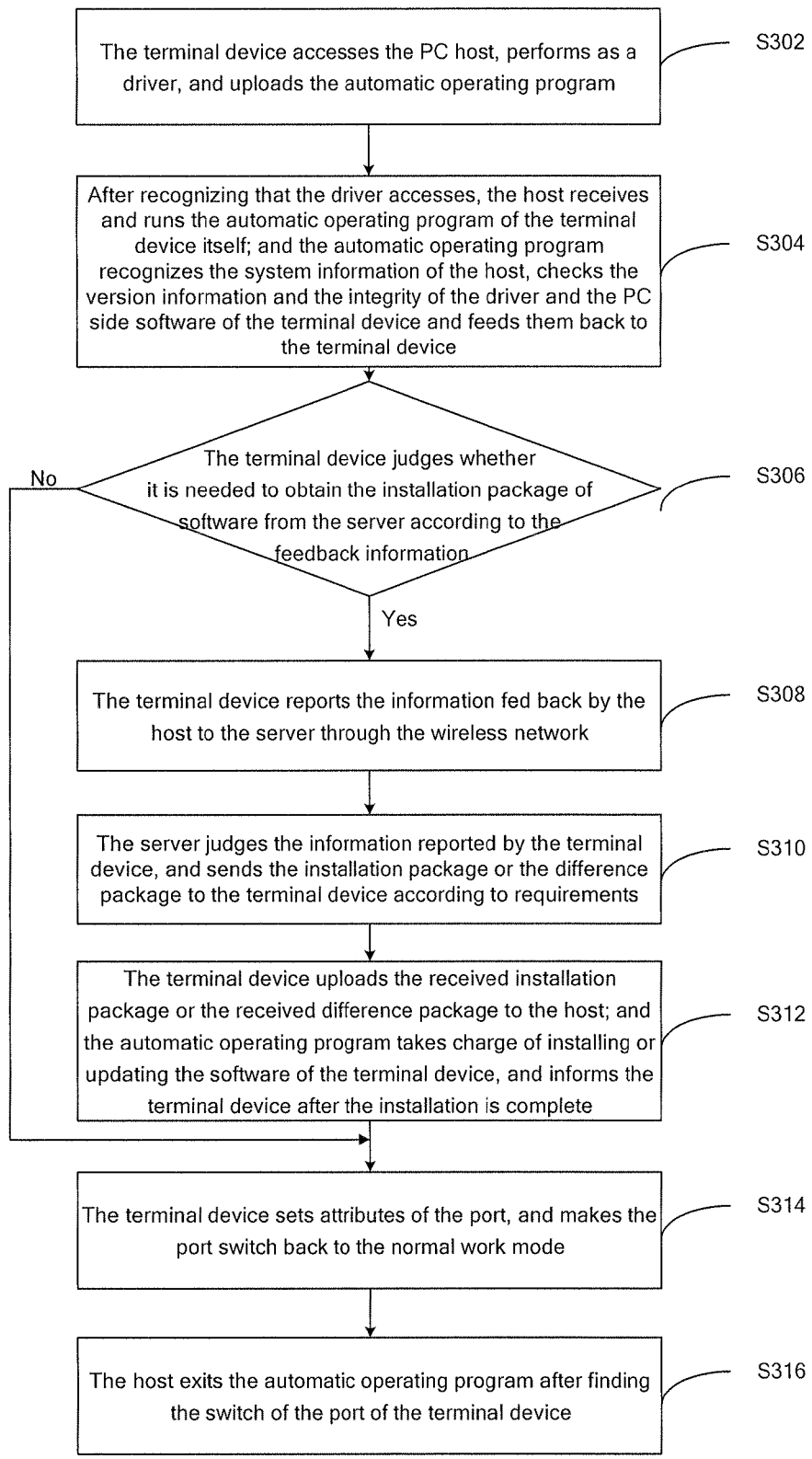
FIG. 3 is a flow chart of a method for installing terminal software according to Embodiment 2 of the present invention.

With reference to FIG. 3, on the basis of the system shown in FIG. 2, the embodiment provides a method for installing terminal software, comprising the steps as follows.

Step S302: the terminal device accesses the PC host, performs as a driver, and uploads the automatic operating program. Since the PC host can automatically identify the driver device, a simple connection can be established between the terminal device and the PC host without installing any driver.

Step S304: after recognizing that the driver accesses, the host receives the automatic operating program of the terminal device itself through the established common connection, and runs the automatic operating program. The automatic operating program recognizes the system information of the host, checks the version information and the integrity of the driver and the PC side software of the terminal device and feeds them back to the terminal device.

Step S306: the terminal device judges whether it is needed to obtain the installation package of software from the server according to the feedback information. If YES, execute Step S308, otherwise, execute Step S314.

When the feedback information is about that the driver and application software of the terminal device, which is installed on the PC side, are incomplete, it is needed to obtain the installation package of software from the server. Alternatively, when the terminal device is set as needing to check software update (e.g., the driver and application software of the terminal device are complete, but the installation time exceeds the set update time), it is also needed to obtain the installation package of software from the server. Otherwise, execute Step S314.

Step S308: the terminal device reports the information fed back by the host to the server through the wireless network.

Step S310: the server judges the information reported by the terminal device, and sends the installation package or the difference package to the terminal device according to requirements.

Step S312: after receiving the installation package or the difference package sent by the server, the terminal device uploads the received files to the host, and informs the automatic operating program of the host side. The automatic operating program takes charge of installing or updating the software of the terminal device, for example, the driver or the PC side software (i.e. the application program of the terminal device), and informs the terminal device after the installation is complete.

Step S314: after receiving the information about that the host completes the installation, the terminal device sets attributes of the port, at the terminal side, connecting the PC, and makes the port switch back to the normal work mode.

Step S316: the host exits the automatic operating program after finding the switching of the port of the terminal device.

By adopting the above ways, the embodiment first solves the problem of updating the USB driver and the PC side software; since the installation package is no longer limited by the memory of the terminal device, the PC side software can have more extended functions, which improves the quality of products; simultaneity, the cost of manufacturing and packaging the installation CD is saved; since the installation package is no longer fixed in the memory of the mobile phone, at least 8M of memory overhead is saved, which reduces the cost of hardware, facilitates the update and maintenance of the terminal software, and further reduces the cost of maintenance; and the user does not need to be involved in the installation process, which greatly reduces the complexity of user operation and enhances the user experience. Based on so many advantages above, the terminal products adopting the technology will become more competitive in the market.

Embodiment 3

Figure 4:
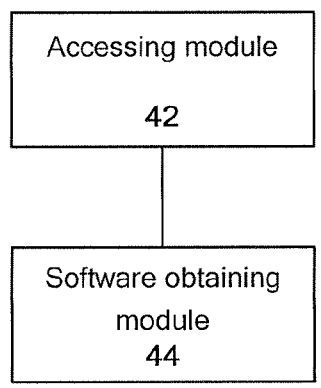
FIG. 4 is a structural block diagram of a device for installing terminal software according to Embodiment 3 of the present invention.

FIG. 4 is a structural block diagram of a device for installing terminal software according to one embodiment of the present invention. The device can be set on the terminal, and comprises the modules as follows.

An accessing module 42, is configured to determine to access the host (which means the computer host) as a driver according to attributes of the current port, upload the automatic operating program to the host so that the automatic operating program runs on the host, and obtain and feed back the information related to terminal software on the host.

In the process of implementation, the accessing module 42 is connected with the host through the USB cable.

A software obtaining module 44, which is connected with the accessing module 42, is configured to use the information related to terminal software fed back by the host to obtain the corresponding terminal software from the server, and upload the obtained terminal software to the host so that the automatic operating program installs the terminal software on the host.

There is the automatic operating program pre-stored on the device of the embodiment of the present invention, wherein the automatic operating program can be stored in the memory of the device. The terminal device performs as a driver after being connected to the host through the USB cable, and automatically uploads the automatic operating program in the memory to the host.

After running, the automatic operating program obtains the information related to terminal software on the host. For example, the automatic operating program recognizes the system information of the host, wherein the system information comprises the hardware configuration of PC and the operating system information; and the automatic operating program checks the information related to terminal software corresponding to the terminal, according to the system information, wherein the information related to terminal software comprises: the information about whether the terminal software of the terminal is complete and/or the version information of the terminal software of the terminal, for example, whether the driver of the terminal is complete, and whether the application program of the terminal is complete, etc.

The software obtaining module 44 can be realized in multiple ways. For example, the software obtaining module 44 comprises: a judging module, which is configured to judge whether it is needed to obtain the corresponding terminal software from the server according to the information related to terminal software; a sending module, which is configured to send the information related to terminal software to the server when the judgment result of the judging module is YES; a receiving module, which is configured to receive the corresponding terminal software that is searched and fed back by the server according to the information related to terminal software. Alternatively, the software obtaining module 44 only comprises the sending module and the receiving module, and in this case, the sending module directly sends the information related to terminal software to the server.

For the situation that the terminal accesses the host for the first time, since there is not any software of the terminal installed on the host, the information related to terminal software will be about that the terminal software of the terminal is incomplete. In this way, after receiving the feedback information, the terminal informs the server, downloads the installation packages, such as the driver and the application program of the terminal, etc. from the server, and uploads the installation packages to the host.

For the situation that the terminal accesses the host not for the first time, since there is related software of the terminal stored on the host, the information related to terminal software will be the version information of the terminal software of the terminal. When checking that the information related to terminal software is the version information of the terminal software of the terminal, the terminal uses the version information of the terminal software to obtain the difference package of the terminal software from the server. The difference package will be forwarded to the host by the terminal. At this point, the automatic operating program uses the difference package to update the terminal software of the host. This terminal software updating way is quite quick, and the software transmitted in the communication process is small, which effectively ensures the success rate of transmission.

Preferably, the terminal determines whether it is needed to check software update according to its own configuration information; if YES, the terminal sends the version information of the terminal software to the server; and the server sends the difference package of the terminal software to the terminal according to the version information of the terminal software. The configuration information can be set by the user, and can also be set by the terminal according to a certain event. For example, the terminal comprises: an option setting module, which is configured to set the option needing to check software update in its own configuration information to be valid at predetermined intervals, and set the option needing to check software update to be invalid after each terminal software update is complete. Alternatively, when the configuration information is set by the user, the terminal can also comprise: an option setting module, which is configured to receive the setting instruction from the user, wherein the setting instruction is enabling or disabling the option needing to check software update, and set the option needing to check software update according to the setting instruction. For example, if the setting instruction is enabling, the option setting module sets the option needing to check software update to be enabled, that is, the option is valid, otherwise, the option setting module sets the option to be disabled, that is, the option is invalid.

After being connected to the host, the device of the embodiment automatically uploads its own automatic operating program to the host, so as to complete the automatic installation of the terminal software through the automatic operating program; and the whole installation process can be implemented without the involvement of the user, which solves the problem that it is inconvenient to install and use the terminal software. Simultaneously, by this way it is not required to occupy a lot of storage space of the terminal to store the terminal software, and the terminal software can be automatically updated timely, and thereby the complexity of installing the driver and the PC side software by user is simplified, the requirement of products for application update while reducing cost is met, the user experience is enhanced, and the quality of products is improved.

Embodiment 4

Figure 5:
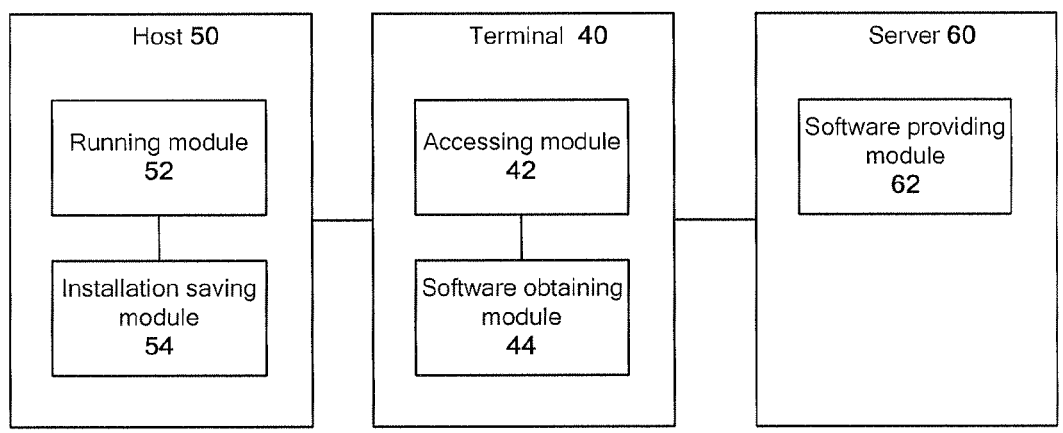
FIG. 5 is a structural block diagram of a system for installing terminal software according to Embodiment 4 of the present invention.

FIG. 5 is a structural block diagram of a system for installing terminal software according to one embodiment of the present invention. The system comprises: a terminal 40, a host 50 and a server 60, wherein the terminal 40 is connected with the host 50 through the USB cable; the host 50 is connected with the server 60 through the wireless network; and the terminal 40 can be realized according to the way in Embodiment 3. For example, the terminal 40 comprises:

the accessing module 42, which is configured to determine to access the host 50 as a driver according to attributes of the current port, and upload the automatic operating program to the host 50; and the software obtaining module 44, which is configured to use the information related to terminal software fed back by the host 50 to obtain the corresponding terminal software from the server 60, and upload the obtained terminal software to the host 50.

The host 50 comprises:

a running module 52, which is configured to run the automatic operating program uploaded by the terminal 40, wherein the automatic operating program obtains the information related to terminal software on the host 50, and feeds the obtained information related to terminal software back to the terminal 40; and an installation saving module 54, which is connected with the running module 52, and is configured to save the terminal software installed by the automatic operating program.

The server 60 comprises: a software providing module 62, which is configured to provide the terminal 40 with the terminal software corresponding to the information related to terminal software.

The specific implementation of the system can refer to that of the system shown in FIG. 2 of Embodiment 2, so it will not be repeated here.

The embodiment is the system built based on the methods described in Embodiment 1 and Embodiment 2. The system can not only simplify the operation of the user, but also update the driver and the PC side software of the terminal device timely, and enhance the user experience. Besides, the installation package is no longer fixed in the driver disk or the memory of the terminal device, so the cost of hardware is reduced.

It can be seen from the description above that the embodiment of the present invention realizes the functions such as automatic installation (comprising automatic update) and the like of the terminal software by the way of configuring the automatic operating program on the terminal, uploading the automatic operating program to the host after the terminal is connected to the host, providing the information related to terminal software on the host by the automatic operating program, wirelessly obtaining, by the terminal, the software corresponding to the terminal from the server according to the information, and installing the obtained software on the host by the automatic operating program. Besides, it is not required to occupy too much memory space of the terminal to store the terminal software, so the cost of hardware is reduced.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

The descriptions above are only the preferable embodiment of the present invention, which are not used to restrict the present invention. For those skilled in the art, the present invention may have various changes and variations. Any amendments, equivalent substitutions, improvements, etc. within the spirit and principle of the present invention are all included in the scope of the protection of the present invention.

What is claimed is:

1. A method for installing terminal software, comprising:
a terminal determining to access a computer host as a driver according to attributes of a current port, and uploading an automatic operating program to the host;
the host running the automatic operating program, and then the automatic operating program obtaining information related to terminal software on the host and feeding the obtained information related to terminal software back to the terminal;
the terminal using the information related to terminal software to obtain corresponding terminal software from a server, and uploading the obtained terminal software to the host; and
the automatic operating program installing the terminal software on the host;
wherein the step of the automatic operating program obtaining the information related to terminal software on the host comprises: the automatic operating program recognizing system information of the host, and checking the information related to terminal software corresponding to the terminal according to the system information, wherein the information related to terminal software comprises: information about whether the terminal software of the terminal is complete and/or version information of the terminal software of the terminal;
wherein after the automatic operating program installs the terminal software on the host, the method further comprises: the automatic operating program sending a notification that installation is completed to the terminal; after receiving the notification, the terminal setting the attributes of the current port and making the current port switch back to a normal work mode; and after detecting a switch of the current port of the terminal, the host exiting the automatic operating program.

2. The method according to claim 1, wherein the step of the terminal using the information related to terminal software to obtain corresponding terminal software from the server comprises:
the terminal judging whether it is needed to obtain the corresponding terminal software from the server according to the information related to terminal software, and if YES, the terminal sending the information related to terminal software to the server; and
the server searching the corresponding terminal software according to the information related to terminal software, and sending the found terminal software to the terminal.

3. The method according to claim 1, wherein the step of the terminal using the information related to terminal software to obtain corresponding terminal software from the server comprises:
the terminal sending the information related to terminal software to the server; and the server searching the corresponding terminal software according to the information related to terminal software, and sending the found terminal software to the terminal.

4. The method according to claim 1, wherein, the step of the terminal using the information related to terminal software to obtain the corresponding terminal software from the server comprises: when checking that the information related to terminal software is the version information of the terminal software of the terminal, the terminal using the version information of the terminal software to obtain a difference package of the terminal software from the server; and the step of the automatic operating program installing the terminal software on the host comprises: the automatic operating program using the difference package to update the terminal software of the host.

5. The method according to claim 4, wherein the step of the terminal using the version information of the terminal software to obtain the difference package of the terminal software from the server comprises:
the terminal judging whether it is needed to check software update according to its own configuration information, and if YES, the terminal sending the version information of the terminal software to the server; and the server sending the difference package of the terminal software to the terminal according to the version information of the terminal software.

6. The method according to claim 5, wherein before the terminal judges whether it is needed to check software update according to its own configuration information, the method further comprises:
the terminal setting an option needing to check software update, which is set in its own configuration information, to be valid at predetermined intervals, and setting the option needing to check software update to be invalid after each terminal software update is complete.

7. The method according to claim 5, wherein before the terminal judges whether it is needed to check software update according to its own configuration information, the method further comprises:
the terminal receiving a setting instruction from the user, wherein the setting instruction is enabling or disabling the option needing to check software update; and
the terminal setting the option needing to check software update according to the setting instruction.

8. A device for installing terminal software, having a processor, comprising:
an accessing entity, which is configured to determine to access a host as a driver according to attributes of a current port, upload an automatic operating program to the host so that the automatic operating program runs on the host, and obtain and feed back information related to terminal software on the host; and
a software obtaining entity, which is connected to the accessing entity and configured to use the information related to terminal software fed back by the host to obtain corresponding terminal software from the server, and upload the obtained terminal software to the host so that the automatic operating program installs the terminal software on the host;
wherein the information related to terminal software on the host corresponds to the terminal and the information related to terminal software is checked, by the automatic operating program, according to the system information, wherein the information related to terminal software comprises: information about whether the terminal software of the terminal is complete and/or version information of the terminal software of the terminal;
wherein the device for installing terminal software is further configured to, after receiving a notification that installation is completed, set the attributes of the current port and make the current port switch back to a normal work mode.

9. A system for installing terminal software, having a processor, comprising: a host, a terminal and a server; wherein
the terminal comprises:
an accessing entity, which is configured to determine to access a host as a driver according to attributes of a current port, and upload an automatic operating program to the host; and
a software obtaining entity, which is connected to the accessing entity and configured to use information related to terminal software fed back by the host to obtain corresponding terminal software from the server, and upload the obtained terminal software to the host;
the host comprises:
a running entity, which is configured to run the automatic operating program uploaded by the terminal, wherein the automatic operating program obtains the information related to terminal software on the host, and feeds the obtained information related to terminal software back to the terminal; and
an installation saving entity, which is connected to the running entity and configured to save the terminal software installed by the automatic operating program; and
the server comprises: a software providing entity, which is configured to provide the terminal with the terminal software corresponding to the information related to terminal software;
wherein the information related to terminal software on the host corresponds to the terminal and the information related to terminal software is checked, by the automatic operating program, according to the system information, wherein the information related to terminal software comprises: information about whether the terminal software of the terminal is complete and/or version information of the terminal software of the terminal;
wherein the host is further configured to send a notification that installation is completed to the terminal; the terminal is further configured to, after receiving the notification set the attributes of the current s ort and make the current ort switch back to a normal work mode; and the host is further configured to, after detecting a switch of the current port of the terminal, exit the automatic operating program.

* * * * *